UNITED STATES PATENT OFFICE 2,025,710

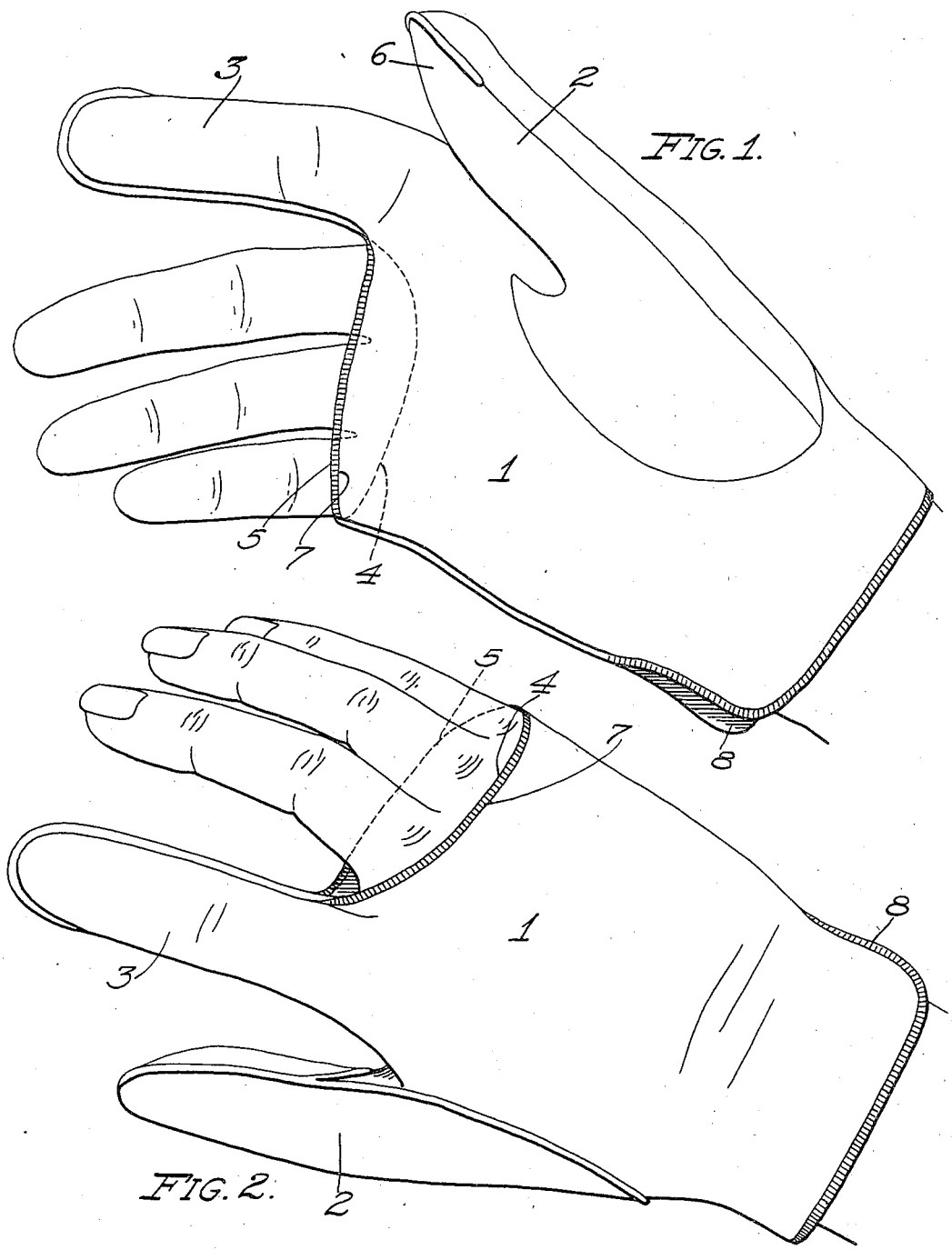

HAND COVERING

Idalyne M. Beemer, Los Angeles, Calif.

Application February 18, 1933, Serial No. 657,398

2 Claims. (Cl. 2—159)

This invention relates to a protective hand covering, resembling in some respects a glove, but differing in various essentials from such devices.

The general object of my invention is to provide a formfitting, somewhat elastic hand covering, capable of protecting portions of the hand, including the thumb and index finger, but leaving the remaining three fingers of the hand entirely free and unobstructed.

Other objects and advantageous features of the invention are clearly set forth in the following description and illustrated in the appended drawing, of which:

Fig. 1 shows the inside of a hand fitted with the protective covering of my invention, and Fig. 2 is a substantiatially corresponding view presenting the outside of the hand, with the protective cover in place.

The hand cover of my invention is primarily designed for use by housewives, cooks and other persons occupied in preparing meals, and it is especially convenient and desirable in peeling and paring vegetables, fruit and other food products, but may, of course, find wider field of utility.

The device of my invention comprises, a body portion 1, to which is fitted a thumb sheath 2, and which terminates in a sheath 3, for the index finger. These three elements of the device may be shaped after the fashion of a glove, but the material used must be much more pliable and preferably somewhat elastic, so that my hand cover may fit the hand snugly and still allow some freedom of movement.

The hand cover is provided with a transverse opening, extending from the index finger sheath to the outer edge of the cover, for the passage of the remaining three fingers of the hand. It is important to note, that the outer portion 4 and the inner portion 5 of the edge of this opening are not cut on the same line, but that the outer edge 4 is cut back to leave the knuckles at the base of the fingers uncovered. The inner portion 5, on the other hand, is shown extended considerably farther forward for the purpose of protecting the inside of the base joints of the fingers and to help prevent juices and solid fragments from falling into the palm of the hand, within the cover.

As stated, the device should be made from pliable, somewhat elastic material. It must fit the hand snugly in order to remain in position while the hand is occupied in the operations for which the cover is provided. A loose cover would slide around and curl up, thereby to become a hindrance rather than a protection. But if the cover fits properly and the knuckles of the three outer fingers covered, freedom of movement is impaired. Hence the importance of cutting back the upper portion 4 of the edge. If the inner portion 5 were cut back in line with the former, there would be no protection for the base joints of the fingers at the very corner, into which the paring knife, or other appropriate implement, held by the hand, is pressed, often with much force, The edges 4 and 5 should be reinforced by a substantial hem 7, in order to retain its shape and not to curl up in use. The inner surface of the thumb sheath should preferably be reinforced by suitable material 6, such as chamois skin or the like, in order better to withstand contact with the cutting edge of the paring knife.

Ordinary, form fitting gloves are made with a button slit through the center of the palm of the glove. In the device of my invention, this portion of the hand cover is left uncut in order completely to protect the palm of the hand. Any person familiar with such kitchen work as peeling and paring vegetables and fruit will appreciate the necessity of this. While in use, the end of the knife handle, held in one hand, continually moves within the palm. This end would work in through a button slit and catch its edges, thereby to impede the free use of the knife and also to dig into the skin the cover is intended to protect. The other hand holds the article to be peeled between the covered thumb and index finger, and the rough inner end of the article is pressed into the palm to project into such slit and to knead juices and fragments into the skin of the palm. By leaving the palm portion of my protector uncut, this disadvantage is overcome. It is necessary, however, to leave the lower part, 8, of the outer seam open, to facilitate applying and removing the cover to and from the hand. This has the further advantage of forming projecting points, from which juices may drop, clear of the forearm.

I claim:

1. A form fitting, somewhat elastic hand cover comprising a body portion provided with a thumb sheath and an index finger sheath, said body having an opening extending from said index sheath crosswise to the edge of the cover for the passage of the remaining three fingers of a hand, the outside portion of the edge of said opening being cut back to clear the knuckles of the hand, the inner edge portion being extended forward to cover the base joints of said fingers, the entire edge having a substantial hem to prevent curling of the material.

2. A form fitting, somewhat elastic hand cover comprising a body portion of a size to encompass the body of the hand to the wrist and provided with thumb and index finger sheaths, said body portion having an opening for the passage of the remaining three fingers, the outer edge of said opening being cut back to clear the knuckles of the hand, the inner edge of the opening being extended forward to cover the base joints of said fingers, there being along the outer side edge of the hand near the wrist and extending to the wrist a slit in the cover to facilitate its mounting and removal, the cover end being by this slit divided into two projecting non curling lips for directing dripping of juices away from the user's wrist, arm and sleeve.

IDALYNE M. BEEMER.